United States Patent
Gammel et al.

(10) Patent No.: US 10,862,825 B1
(45) Date of Patent: Dec. 8, 2020

(54) TOKEN-BASED DEVICE ACCESS RESTRICTIONS BASED ON SYSTEM UPTIME

(71) Applicant: Schweitzer Engineering Laboratories, Inc., Pullman, WA (US)

(72) Inventors: Dennis Gammel, Pullman, WA (US); Josh Powers, Pullman, WA (US); Jason A. Dearien, Moscow, ID (US); Joshua Thomas Pereyda, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/655,666

(22) Filed: Oct. 17, 2019

(51) Int. Cl.
*H04L 12/911* (2013.01)
*H04L 9/32* (2006.01)
*G06F 1/3206* (2019.01)
*H04L 29/06* (2006.01)

(52) U.S. Cl.
CPC .......... *H04L 47/828* (2013.01); *G06F 1/3206* (2013.01); *H04L 9/3213* (2013.01); *H04L 47/78* (2013.01); *H04L 63/0807* (2013.01)

(58) Field of Classification Search
CPC ... H04L 47/78; H04L 47/828; H04L 63/0807; H04L 9/3213; G06F 1/3206
USPC ....................................................... 709/226
See application file for complete search history.

(56) References Cited

U.S. PATENT DOCUMENTS

| | | |
|---|---|---|
| 5,747,957 A | 5/1998 | Hayashida |
| 7,266,849 B1 | 9/2007 | Gregory |
| 7,872,983 B2 | 1/2011 | Lai |
| 8,520,670 B1 | 8/2013 | Giniger |
| 8,553,544 B2 | 10/2013 | Lai |
| 8,800,044 B2 | 8/2014 | Raad |
| 9,686,125 B2 | 6/2017 | Smith |
| 9,760,504 B2 | 9/2017 | Vidyapoornachary |
| 9,769,060 B2 | 9/2017 | Dearien |
| 9,866,483 B2 | 1/2018 | Smith |
| 9,900,206 B2 | 2/2018 | Grussling |
| 9,923,779 B2 | 3/2018 | Berner |
| 10,341,311 B2 | 7/2019 | Smith |
| 2007/0217344 A1 | 9/2007 | Krywaniuk |
| 2012/0216296 A1* | 8/2012 | Kidron .................. G06F 15/167 726/28 |
| 2013/0212285 A1 | 8/2013 | Hoffmann |
| 2014/0029451 A1 | 1/2014 | Nguyen |
| 2017/0026225 A1 | 1/2017 | Smith |

(Continued)

*Primary Examiner* — Frantz B Jean
(74) *Attorney, Agent, or Firm* — Justin K. Flanagan; Bradley W. Schield

(57) ABSTRACT

Systems and methods are described herein for token-based access to an intelligent electronic device (IED) resource in a power delivery system. A token server and an IED resource may be communicatively connected via a communication network. The token server may generate a token associated with access privileges to one or more IED resources. The token server associates an access duration time with the generated token. The user presents the IED resource with the token as part of an access attempt. The IED resource grants access at a first time defined with reference to the device uptime of the IED resource until a second time defined with reference to the device up time. The difference between the first time and the second time corresponds to the access duration time of the token.

20 Claims, 5 Drawing Sheets

(56) References Cited

U.S. PATENT DOCUMENTS

| | | |
|---|---|---|
| 2017/0026226 A1 | 1/2017 | Grussling |
| 2017/0026243 A1 | 1/2017 | Berner |
| 2017/0026252 A1 | 1/2017 | Dearien |
| 2017/0026276 A1 | 1/2017 | Dearien |
| 2017/0026291 A1 | 1/2017 | Smith |
| 2017/0026292 A1 | 1/2017 | Smith |
| 2017/0026349 A1 | 1/2017 | Smith |
| 2017/0026187 A1 | 3/2017 | Ramatchandirane |
| 2017/0289117 A1* | 10/2017 | Powers ............... H04L 63/0823 |
| 2018/0227620 A1* | 8/2018 | Karp .................... H04L 67/22 |

* cited by examiner

TOKEN-BASED DEVICE ACCESS RESTRICTIONS BASED ON SYSTEM UPTIME

TECHNICAL FIELD

The present disclosure relates to systems and methods for restricting access to devices utilizing tokens.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1A:
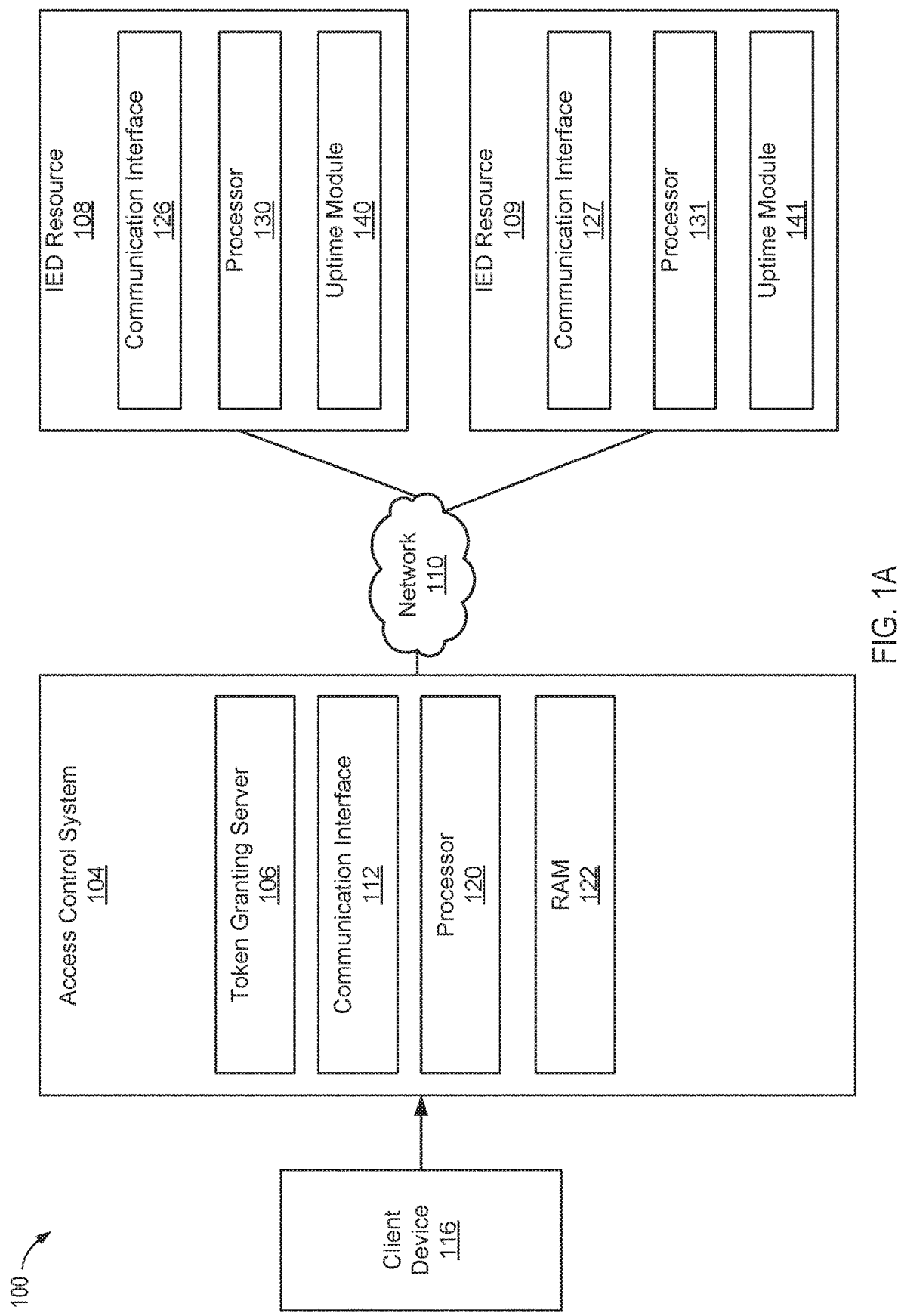
FIG. 1A illustrates a functional block diagram of a token server of an access control system granting a token for access to an intelligent electronic device (IED) for a time duration measured by an uptime counter of the IED.

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry data for the proper assessment of power system conditions and for implementing control actions based on such conditions. In addition, repairs, alterations, upgrades and other adjustments to an intelligent electronic device (IED) resource may facilitate continued operation.

Some electric power transmission and distribution systems may incorporate security protocols to ensure device access is restricted to authorized users, and even then, only during authorized time windows and/or for limited durations of time. Restricting engineering access to an IED resource increases security.

To increase security, token-based access privileges to an IED may specify a time window and/or duration of time for which the user is authorized to access (e.g., download data, upload firmware, modify settings, and/or make other changes) an IED. Many token-based access systems impose time limitations for access measured against the system clock of the IED. By manually modifying the system clock of the IED or spoofing a network-provided time, users may obtain unauthorized access to the IED for a longer duration than intended and/or during time periods outside of an intended access window. As described herein, a token may define the access privileges and permissions associated with the person and/or device for a particular access session or defined time period.

The presently described systems and methods provide token-based security with time limitations, including access duration limits and/or initial access window limits, measured against the device uptime of the IED instead of the system clock or network-provided time. Accordingly, manual modifications to the system clock and/or spoofing a network-provided time will not serve to provide unauthorized access to an IED. Moreover, the IED may be configured to revoke the access privileges associated with all tokens that have been used or are currently in use based on a system reset or modification of the device uptime of the IED.

Token-based access is utilized to verify that the user attempting to access the IED resource is an authorized user. A system that restricts access to an IED resource in a power delivery system may include a communication network that connects a token server, one or more IED resources, and/or user terminal(s). A token server may generate a token associated with access privileges to at least one IED resource. The token server may associate an access duration time with the token. The user may present the access token to an IED in an attempt to gain access. The IED can verify the token to grant access for the associated access duration time based on token validation information previously provided by the token server and/or in real-time via the communication network.

Then, rather than rely on an internal clock or network-provided time signal, the IED may determine a current uptime status of the IED. The "up time" or uptime of the IED may be an internally available counter value of how many seconds (or another time unit) the IED has been operational since the last reset or power down. This value is not user-changeable and does not rely on, potentially spoofable, external time signals. Accordingly, the uptime-based access duration granted via the token will limit the user's access to the specific access duration time.

For example, the IED may grant access to the IED resource based on validation of the token between a first time and a second time measured with reference to the device uptime, where the difference between the first time and the second time corresponds to the access duration time of the token. In some embodiments, the token server may also generate an initial access time (e.g., a specific time after which the user may access the IED, a specific time before which the user may access the IED, and/or a window of time during which the user may access the IED). The IED may validate the initial access time prior to granting access to the user.

As a specific example to illustrate the functionality described above, a token server may grant a token to a user that is valid for a specific calendar day during a specific window of time, such as between 9 am and 5 pm but limit the access duration to three hours. The user may present the IED with the token at 10 am on the specified calendar day and be granted access until noon based on a two-hour access time measured using the IED's device uptime. In some embodiments, the token may be invalidated if the IED is shutdown (resetting the device uptime counter) while the user is accessing the IED. Changes to the system clock or spoofing of a network-provided time do not affect the access duration because the IED relies on the device uptime.

In some instances, the token may grant specific access privileges to the user but deny others. In some embodiments, the access privileges may be automatically determined based on a user's role or limitations exerted by a supervisor or other approving entity. In some instances, the token server may generate a token that is automatically encoded with a subset of access privileges and/or and access duration window (e.g., an initial start time and/or access duration time) based on user-provided credentials. In some embodiments, a data store may be used to store and/or report access attempts, user information, token information, and/or changes made during an access session.

In various embodiments, the token may be granted and/or approved based on the authorities and/or relationship of the requesting user. A communication device, as the term is used herein, includes any device capable of accepting and forwarding data traffic in a data communication network. The communication device may also be referred to as a client device and/or a user device. In some embodiments, the IED resource may serve as the communication device. In addition to the functionality of accepting and forwarding data traffic, communication devices may also perform a wide variety of other power monitoring and/or control functions.

The embodiments of the disclosure may be further understood by reference to the drawings, wherein like parts are designated by like numerals throughout. The following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. The components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network (e.g., instructions stored on a non-transitory medium). A software module or component may, for instance, comprise one or more physical or logical blocks of computer instructions, which may be organized as a routine, program, object, component, data structure, etc., that performs one or more tasks or implements particular data types.

In certain embodiments, a particular software module or component may comprise disparate instructions stored in different locations of a memory device, which together implement the described functionality of the module. Indeed, a module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product, including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1A illustrates a functional block diagram 100 of an example of token-based access control of intelligent electric device (IED) resources 108 and 109 utilizing an access control system 104. A token-granting server 106 of the access control system 104 generates, transmits, and distributes an at least one token to grant access to one or more IED resources (e.g., IED resources 108 and 109). A user may request a token via a client device 116 and/or present received tokens to the IED resources 108 and 109 via the client device 116 or a different client device (e.g., an in-the-field client device). The IED resource 108 and/or 109 may validate the token and grant a user engineering (or other) access privileges. The access control system 104 may be integrated into an electric power transmission and distribution system to restrict the access to an IED resource, such as IED resources 108 and 109, that monitor, control, automate, and/or otherwise impact the operability of one or more components in a power delivery system.

The access control system 104 may include a processor 120 and random access memory (RAM) 122 to implement its functionality. The network 110 may facilitate communication between the access control system 104 and the IED resources 108 and 109. As described herein, a granted token may be associated with an access time duration that limits the user to a specific duration of time during which the user may access an IED. The IED resources 108 and 109 may include communication interfaces 126 and 127 to communicate over network 110 and/or with client device 116 for receiving and validating tokens. The IED resources 108 and 109 may further include processors 130 and 131 and uptime modules 140 and 141.

The uptime modules 140 and 141 may provide a count of how long each respective IED resource 108 and 109 has been running since the last shutdown or reset. As described herein, the IED 108, 109 may measure the access duration time associated with a token using the uptime count from the uptime module 140 and 141 to ensure that the user does not exceed an authorized amount of access time. Use of the uptime count prevents unauthorized access or extension of the access time through manipulation of the system clock and/or manipulation or spoofing of a network time signal (e.g., satellite, radio frequency, or cable-based time signals).

Figure 1B:
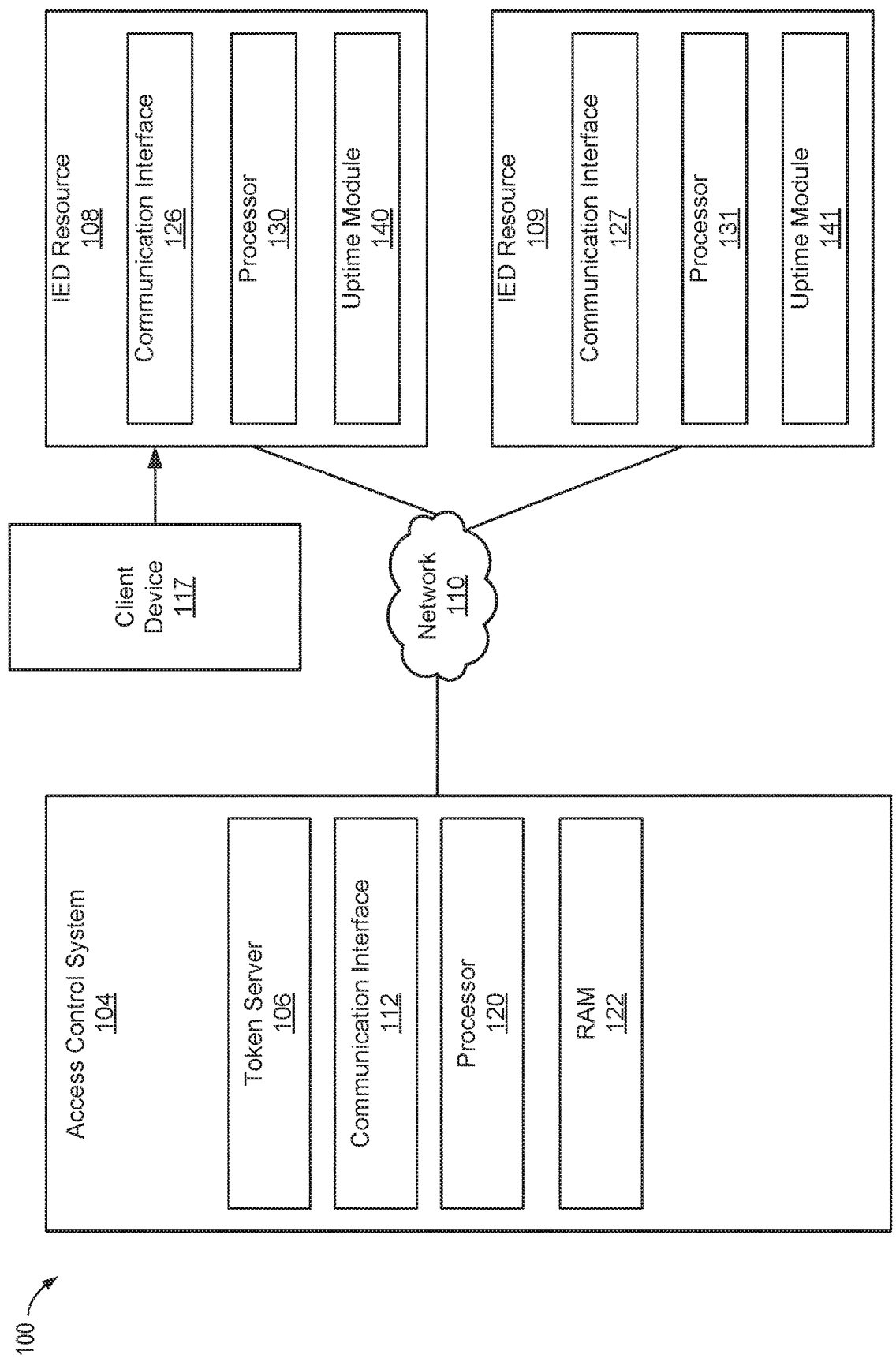
FIG. 1B illustrates a user device presenting the token to an IED for access during a time period measured by the uptime of the IED.

FIG. 1B illustrates a user presenting a token to an IED resource 108 via a client device 117. The IED resource 108 may validate the token with the access control system 104 via the network 110 in real time. Alternatively, the access control system 104 may have previously sent validation information to the IED resource 108 that the IED resource 108 can now use to validate the token. The IED resource 108 may grant the user access with a set of access privileges for a specific duration of time (access duration time) specified by the token and measured using the device uptime via the uptime module 140.

In another embodiment, the uptime counter of multiple IEDs networked via network 110 are used to validate and measure the access duration time. For example, the user may be granted access to IED resource 108 for a duration of time specified by the token and measured by the uptime module 140. Additionally, the IED resource 108 may confirm the time using the uptime information from the uptime module 141 of the IED resource 109 connected via the network 110 to further validate that the access duration time is not exceeded. If either uptime count (from uptime modules 140 and 141) indicates that the access duration time has expired, user access is terminated.

In another embodiment, each IED 108 and 109 uses the uptime count of the uptime module of a different networked IED. For example, IED resource 108 may grant a user engineering access in response to a token presented via the client device 117 for a specified access duration time measured using the uptime count from the uptime module 141 of the other IED resource 109 communicated via network 110 or a direct communication connection. In some embodiments, the client device 117 may be an interface or user-terminal of the IED resource 108.

Figure 2:
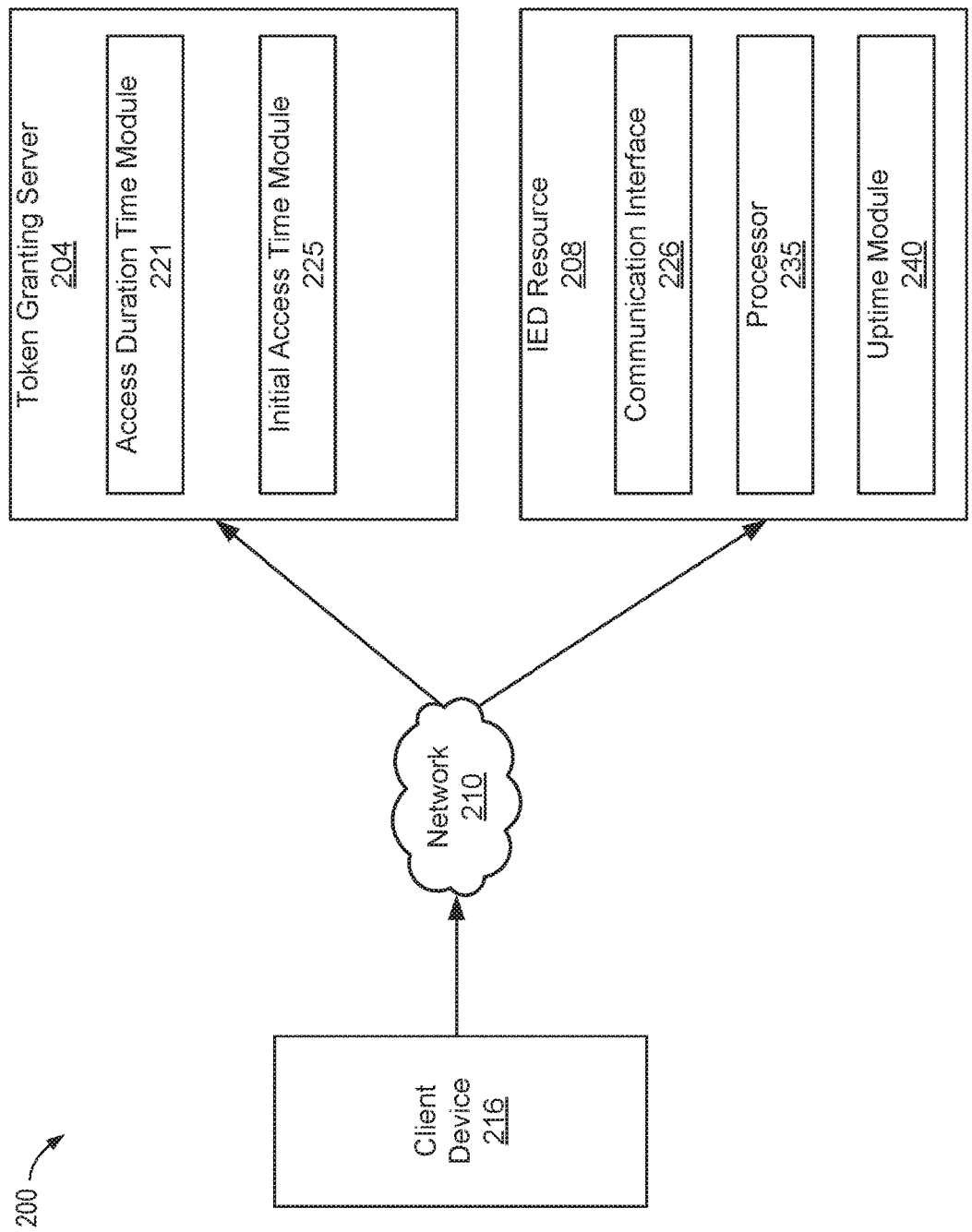
FIG. 2 illustrates a functional block diagram of a token server granting a token for an access duration measured using the device uptime of the IED.

FIG. 2 illustrates a functional block diagram 200 of a client device 216 requesting a token from a token granting server 204 via a network 210. The token granting server 204 may associate an access duration time with the token via an access duration time module 221. The access duration time may specify an amount of time that a user may access an IED resource 208. In some embodiments, an initial access time may also be associated with the token via an initial access time module 225 (e.g., an absolute time (year, day, hour, minute, second, etc.)). The initial access time may define a time after which the token can be used to access the IED resource 208, a time before which the token can be used to access the IED resource 208, or a time window during which the token may be used to access the IED resource 208.

A communication interface 226 of the IED resource 208 may receive validation information from the token granting server 204 via the network 210. The validation information allows the IED resource 208 to validate a token presented by the client device 216 (or another client interface device). A validated token may grant the user access to the IED resource 208 for the access duration time measured by an uptime module 240 in conjunction with the processor 235. Accordingly, changes to an absolute time of the IED resource 208 will not affect the access duration time.

Figure 3:
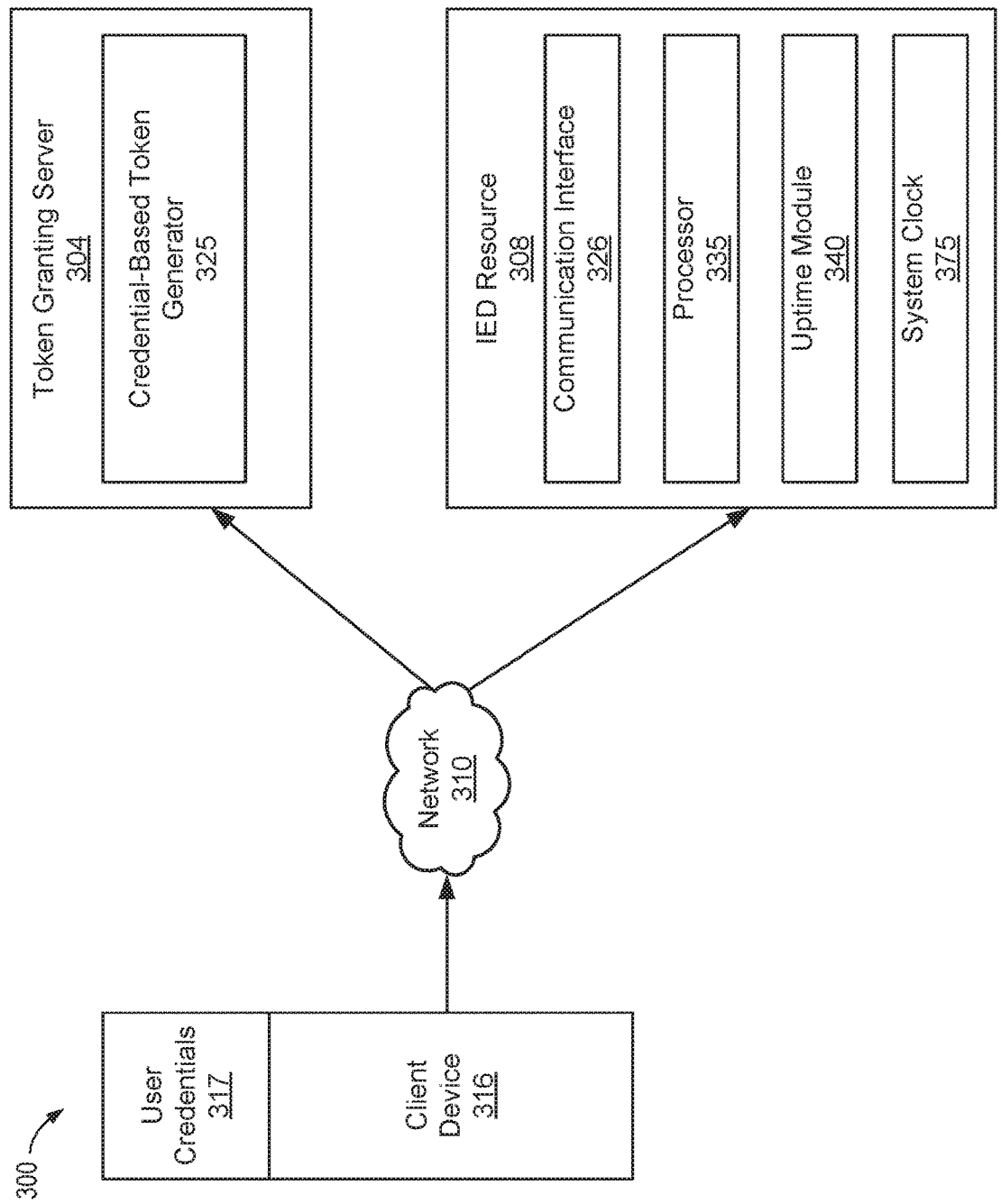
FIG. 3 illustrates a functional block diagram of another example of a token server granting a token for an access duration measured using the device uptime of the IED.

FIG. 3 illustrates a functional block diagram 300 of another example of a token granting server 304 granting a token for an access duration measured using the device uptime of an IED resource 308. In the illustrated embodiment, a user requests a token from a token granting server 304 by providing user credentials 317 using a client device 316 via a network 310. The token granting server 304 provides the user with a token for accessing the IED resource 308 via a credential-based token generator 325. The credential-based token generator 325 may utilize the user credentials 317 to generate a token encoded with one or more of: access privileges granted, access privileges denied, an access duration time, and/or an initial access time.

The token granting server 304 may convey information to the IED resource 308 via the network 310 that the IED resource 308 may use to validate the token. The IED resource 308 may include a communication interface 326 and a processor 335. An uptime module 340 may provide an uptime count corresponding to the amount of time since the IED resource 308 was last restarted. Upon validation of a token, the IED resource 308 may grant a user access for an amount of time corresponding to the token-encoded access duration time. The IED resource 308 measures the access duration time using the uptime count provided by the uptime module 340. In contrast, a system clock 375 is not used to measure the access duration time.

Accordingly, modifications to the system clock 375 and/or spoofed network times cannot be used to extend the access duration time. In some embodiments, the IED resource 308 may measure the access duration time using the uptime count from the uptime module 340 and the system clock 375. A discrepancy therebetween and/or expiration of the access duration time may result in termination of user access to the IED resource 308.

Figure 4:
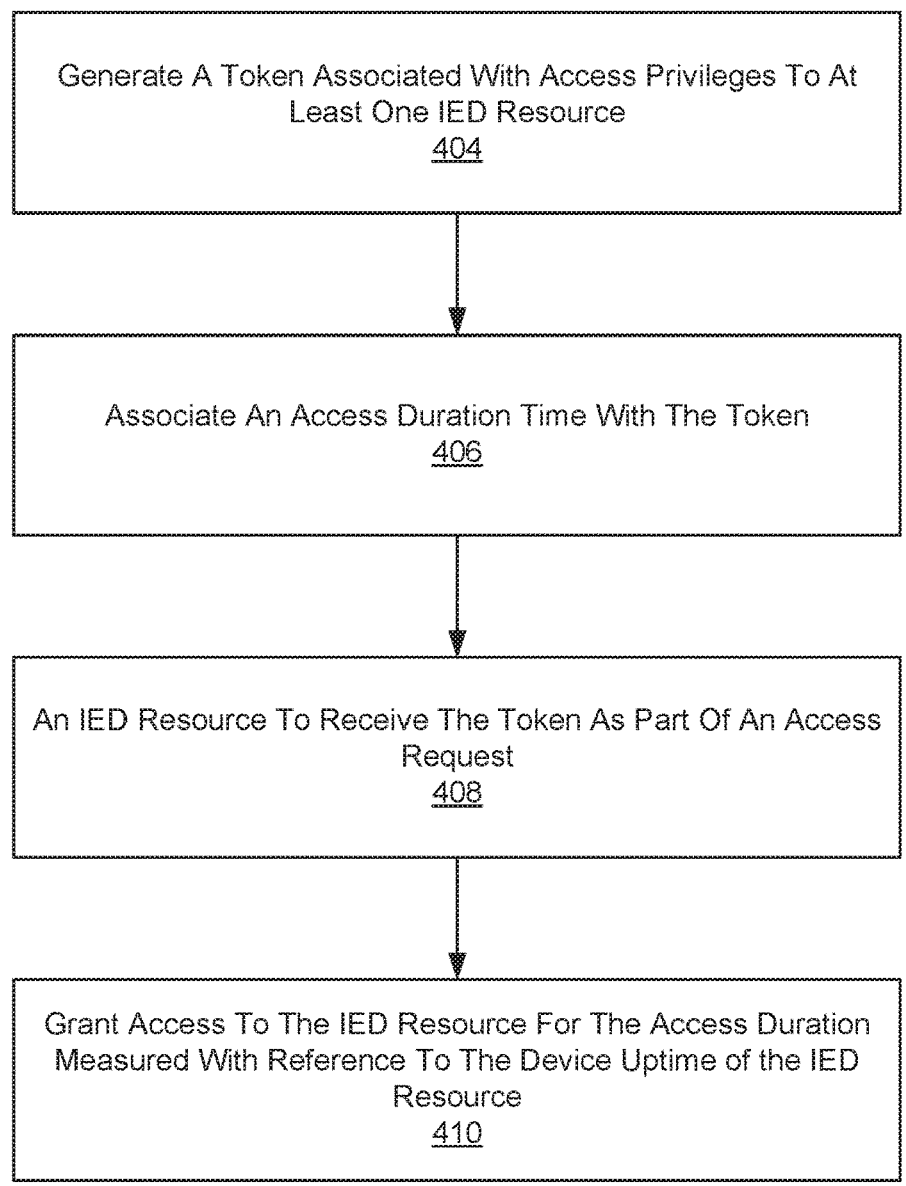
FIG. 4 illustrates a flowchart of a method for token-based access to an IED for a time period measured using the device uptime of the IED.

FIG. 4 illustrates a flowchart 400 of a method for token-based access to an IED resource for a time period measured using the device uptime of the IED resource. A token granting server generates, at 404, a token associated with access privileges to an IED resource, or possibly multiple IED resources. Each token generated for a user may be associated, at 406, with an access duration time. The user may then present the token, immediately or at a later date, to an IED resource as part of a request for engineering control and/or other access rights to modify the IED resource. The IED resource may receive, at 408, the token and validate the token to confirm that the user is an authorized user with authority to control, access, and/or modify the IED resources at the time of the request for a specified access duration time. The IED resource grants access to the user for the access duration time. The IED resource determines when to terminate the user's access at the expiration of the access duration time using, at 410, the device uptime counter instead of the system clock and/or an external time source.

While specific embodiments and applications of the disclosure have been illustrated and described, the disclosure is not limited to the precise configurations and components disclosed herein. Accordingly, many changes may be made to the details of the above-described embodiments without departing from the underlying principles of this disclosure. The scope of the present invention should, therefore, be determined to encompass at least the following claims.

What is claimed is:

1. A system to restrict access to an intelligent electronic device (IED) resource in a power delivery system, comprising:
   a communication network;
   a token server to:
      generate a token associated with access privileges to at least one IED resource, and
      associate an access duration time with the token; and
   the IED resource in communication with the token server via the communication network to:
      receive the token in connection with an access attempt,
      determine device uptime of the IED resource, and
      grant access to the IED resource based on validation of the token between a first time and a second time measured with reference to the device uptime, where the difference between the first time and the second time corresponds to the access duration time of the token.

2. The system of claim 1, wherein the token server is further configured to generate an initial access time associated with the token, and
   wherein the IED resource is further configured to prevent access based on the initial access time of the token being invalid.

3. The system of claim 2, wherein an access duration time comprises a number of hours, H, and wherein the initial access time comprises a window of days, D, such that the token grants access to a user for H hours anytime in the next D days, where H and D are each real numbers.

4. The system of claim 2, wherein an access duration time comprises a number of minutes, M, and wherein the initial access time comprises a window of time, T, beginning at a time T1 and ending at a time T2, such that the token grants access to a user for M minutes within the time window T1 and T2, wherein M is a real number and T1 and T2 are absolute times.

5. The system of claim 1, wherein the token server is configured to associate the token with a limited set of access privileges to the IED resource.

6. The system of claim 1, wherein the token is invalidated based on the IED resource being shut down after the token is used in connection with an access attempt.

7. The system of claim 1, wherein the token is invalidated based on the device uptime of the IED resource being modified after the token is used in connection with an access attempt.

8. The system of claim 1, wherein the device up time is not modified by changes to the system time source of the IED resource.

9. The system of claim 1, wherein the IED resource further comprises a data storage to record access attempts to the IED resource.

10. The system of claim 1, wherein the token server is configured to generate the token based on credentials provided by a requesting operator, and wherein the access privileges associated with the token are automatically encoded as part of the token based on the credentials of the requesting operator.

11. The system of claim 1, wherein the token server is configured to associate access privileges with the token based on an identified role of a user requesting the token.

12. The system of claim 1, wherein the token server is configured to associate the access duration time with the token by automatic encoding of credentials provided by a requesting user that store information identifying an access duration window permitted to the user.

13. The system of claim 1, wherein the token server is configured to associate the access duration time with the token based on identification of a requesting user.

14. A method of restricting access to an intelligent electronic device (IED) resource in a power delivery system, the method comprising:

communicating, via a communication network;

generating, by a token server, a token associated with access privileges to at least one IED resource;

associating, by the token server, an access duration time with the token;

receiving, by the IED resource, the token in connection with an access attempt;

validating, by the IED resource, the received token;

determining, by the IED resource, device uptime of the IED resource; and granting access, by the IED resource, between a first time and a second time measured with reference to the device uptime, where the difference between the first time and the second time corresponds to the access duration time of the token.

15. The method of claim 14, further comprising:

generating, by the token server, an initial access time window associated with the token.

16. The method of claim 15, further comprising:

preventing access to the IED resource based on a system time of the IED resource is not within the initial access time window associated with the token.

17. The method of claim 14, further comprising:

invalidating the token based on the IED resource being shut down after the token has been used in connection with an access attempt.

18. The method of claim 14, further comprising:

invalidating the token if the IED based on the device uptime of the IED resource being modified after the token is used in connection with an access attempt.

19. The method of claim 14, wherein the device up time is not modified by changes to the system time source of the IED resource.

20. The method of claim 14, further comprising:

recording access attempts to the IED resource in a data store associated with the IED resource.

* * * * *